INVENTORS
E.L. ERWIN
J.P. FIELD
R.J. MAHOOD

ATTORNEY

United States Patent Office 3,441,677
Patented Apr. 29, 1969

3,441,677
AUTOMATIC SWITCHING MATRIX
Edson Lockwood Erwin, Morris County, N.J., and Joseph Patrick Field and Robert John Mahood, San Juan, Puerto Rico, assignors to International Telephone and Telegraph Corporation, New York, N.Y., a corporation of Maryland
Filed Feb. 3, 1965, Ser. No. 430,136
Int. Cl. H04m 7/10
U.S. Cl. 179—18           15 Claims

ABSTRACT OF THE DISCLOSURE

The invention provides a crossbar switch having verticals which are cut to provide mechanically integrated but electrically separated crosspoint sections. Lines are attached to the crosspoints in some of the sections, and control links are attached to the crosspoints in other of the sections. This way each vertical may act as either a primary or a secondary switching circuit, and calls may be completed via a single vertical. Optical modes are provided for completing calls via two or more verticals.

This invention relates to switching networks especially, although not exclusively, for telephone switching and more particularly, to improved matrices for extending switch paths through such networks.

Conventional switching systems use a plurality of cascaded stages to concentrate or expand traffic through a switching network. Usually, this means that each part of the network serves a specialized function and cannot be used to serve other functions as well. In large switching systems, this specialization is desirable. However, the specialization tends to establish an economy of scale by setting a lower limit in practical network size. Networks which are of smaller size, are too expensive.

This scale of economy is especially pronounced in common control systems where the cost of the common control data processing type of equipment must be distributed over the number of lines in the network. If there are too few lines, the per line cost of the system is too high. Thus the small systems have tended to eliminate the data processing equipment and to use step-by-step control where a human performs the "computer" functions. The human control occurs because the subscriber sent dial pulses drive successive switches without requiring any prior data processing. However, much of the flexibility of the common control system is lost because the equipment cannot easily make decisions based upon previously stored data.

Accordingly, an object of the invention is to provide a common control system for a small scale network. In this connection, an object is to provide a unitary switching matrix which eliminates specialized switching stages.

Another object of the invention is to provide a matrix giving a plurality of optional switching routes. In particular, an object is to extend the path through the shortest available route in a non-specialized, unitary switching stage. A further object is to make the most efficient use of components in a small switching network.

These and other objects are accomplished by a unitary matrix of crosspoints which provides a plurality of path options between any two end points. The crosspoints are connected in multiples which function together mechanically, as a single unit, but which are electrically, divided into groups. When a call is placed, a decision making circuit receives and stores subscriber sent digital signals which identify the destination of the call. Based upon these signals, the decision making circuit sequentially, looks at the alternative paths in the order of their desirability. The most desirable path that is available, is then selected and the call is completed. Sometimes, the call may be extended through a single one of the groups and other times, the call may be extended through several cascaded ones of the groups, depending upon previous traffic conditions.

An exemplary manner of accomplishing these and other objects is shown by the attached drawings, in which.

Figure 1:
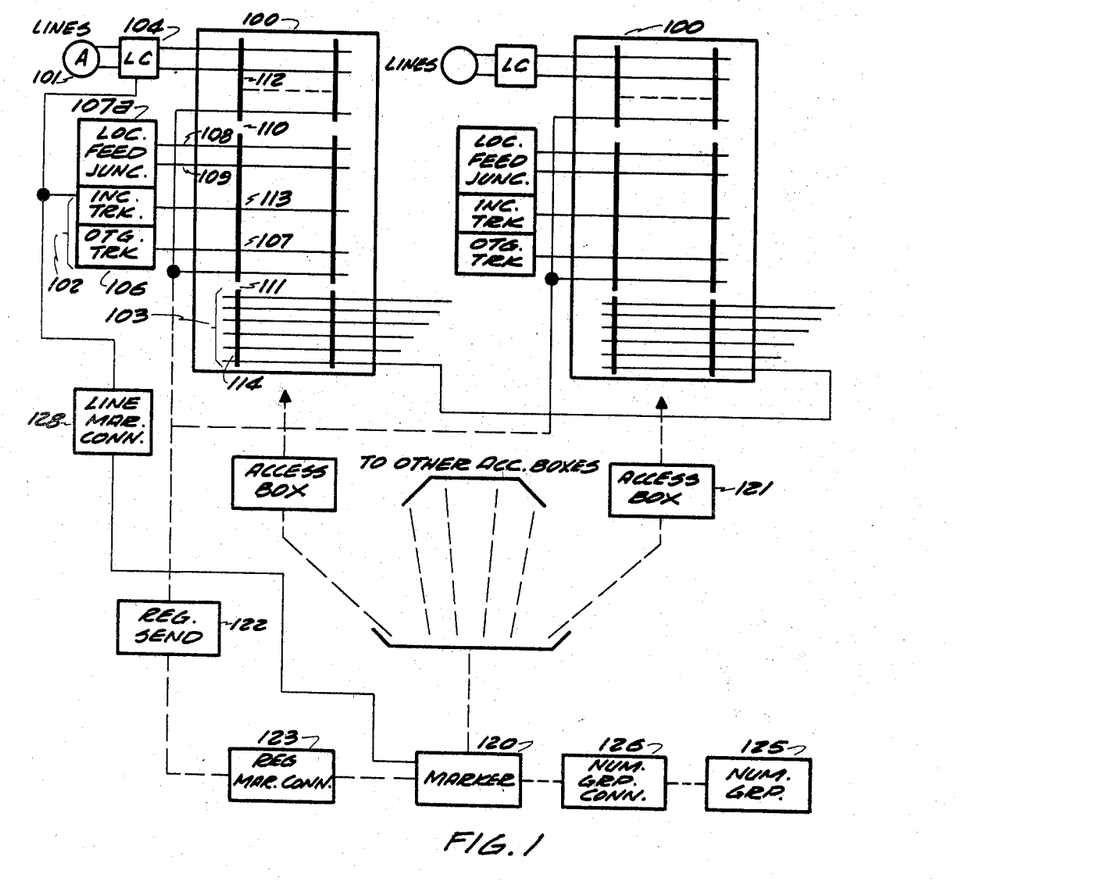
FIG. 1 shows a block diagram of a telephone system using the invention.

FIG. 1 shows a switching matrix 100 having subscriber lines 101, trunks 102, and junctors 103 connected thereto. The matrix comprises vertical and horizontal multiples interconnected by crosspoints, such as a crossbar switch for example. Each subscriber line is connected to a horizontal multiple in the matrix via a well known line circuit 104. Each trunk 102 also connects to a horizontal multiple of the matrix, such as is shown where trunk 106 connects to horizontal 107. The trunks connect the matrix to distance offices. The load feed junctor 107a supplies talking battery via two horizontal multiples of the matrix. One local feed junctor connection 108 serves a calling line (or finder) function; the other local feed junctor connection 109 serves a called line (or connector) function. The two connections 108, 109 provide paths for feeding the talking battery to the calling and called lines.

Figure 1A:
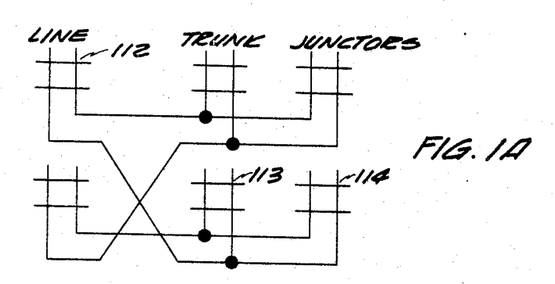
FIG. 1A is an alternative way of showing the crosspoint arrangement which also appears in FIG. 1.

Mechanically, each vertical multiple works as a unit, as is conventional in the crossbar switch art. Electrically, each vertical is divided into separate electrical groups. Thus, a single vertical is split at 110, 111 to provide three electrical groups 112, 113 and 114. For those familiar with another form of symbology, FIG. 1A shows how these same vertical splits may be grouped electrically.

Calls can be extended in either direction between the lines, trunks, and junctors. Thus, for example, on calls from vertical 112 to vertical 113, the "line" switches may be viewed as a primary stage and the "trunk" switches may be viewed as a secondary stage. Likewise, on calls from vertical 114 to vertical 112, the "junctor" switches may be viewed as a primary stage and the "line" switches may be viewed as a secondary stage. The primary-secondary relation for any other call should now be clear. Hence, the electrical groups provide cascaded switching stages, but the mechanical group is a unitary matrix.

The matrix is controlled by a central marker 120, which is a computer-like, data processing device. It is connected to the matrix via accessing circuits 121 and 128, which provides two-way concentration and expansion of crossbar switch to marker traffic. In addition, register-sender combinations 122 are connected between horizontal multiples and the marker 120, via an accessing circuit 123. Number group translators 125 are connected to the marker via access circuitry 126. The translator converts information data from the type stored in the register 122 to the type used by the marker when it controls the crossbar switches. The circuits 120–127 may be any of many circuits which are well known to those skilled in the art.

The nature of the matrix 100 will become more apparent as this description progresses.

Figure 2:
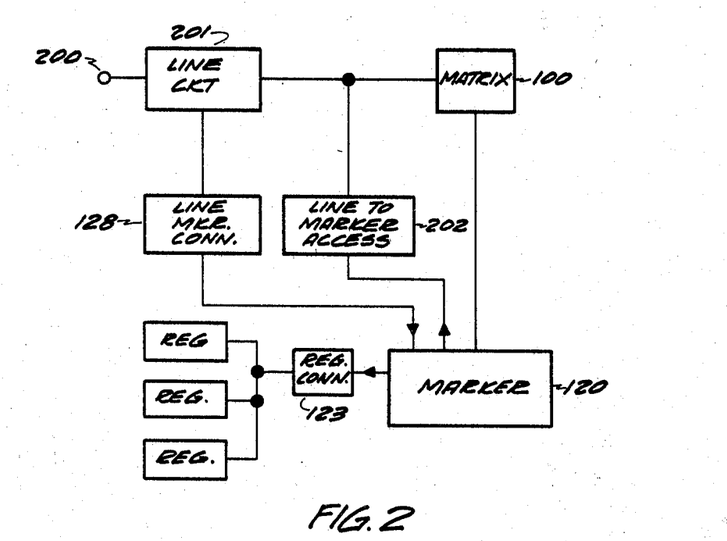
FIGS. 2–6 are a series of simplified block diagrams of system parts (which also appear in FIG. 1) selected to show the logical steps which occur when a call is established.
Figure 3:
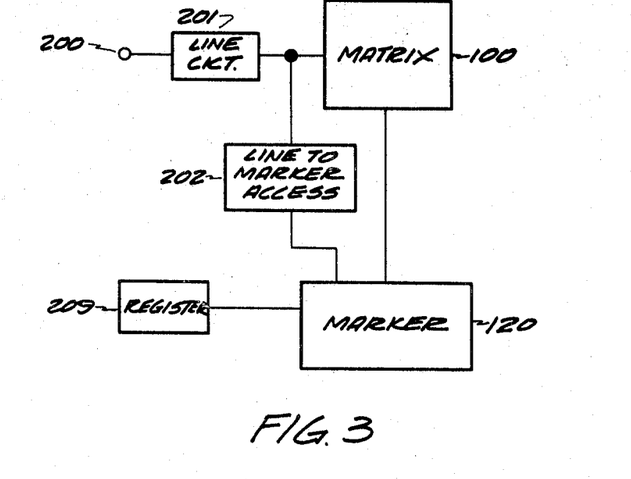
Figure 4:
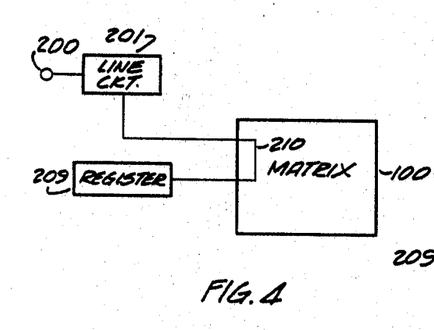

Calls may be extended through the system in the following manner. As shown in FIG. 2, a calling subscriber station 200 goes off-hook and the associated line circuit 201 sends a signal through an access circuit 128 in a well known manner. The marker 120 causes a line marker connector circuit 123, to seize any one of a number of the registers in a given order of preference depending upon the requirements of a particular call (FIG. 3). After one of the registers 209 is found (FIG. 4), the marker sets a path 210, from the calling line circuit 201, through the matrix 100 to the register. Then the marker makes a continuity test to be certain that the register is connected through the matrix via a useful and trouble free path. Establishing the path through the matrix causes the marker and access circuit to release. Next, the register sends dial tone.

Figure 5:
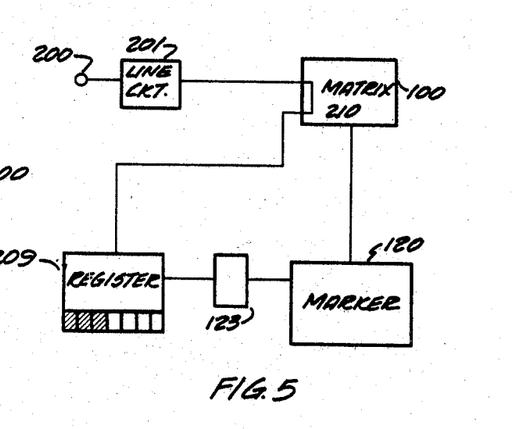

The calling subscriber responds to dial tone by dialling or keying the called line director number. After the first three digits are received, the register 209 extends a connection (FIG. 5) through the register-marker connector 123 to the marker 120. The marker identifies the call as a local call or a trunk call according to the numerical values of the first three digits.

Figure 6:
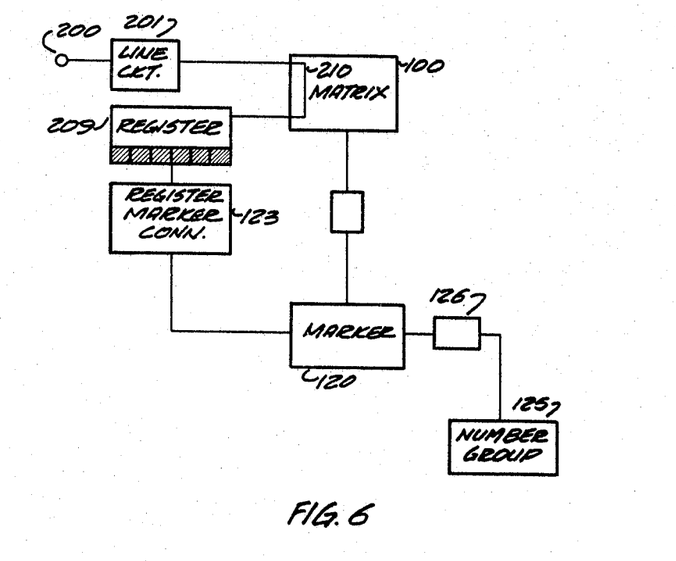
Figure 7:
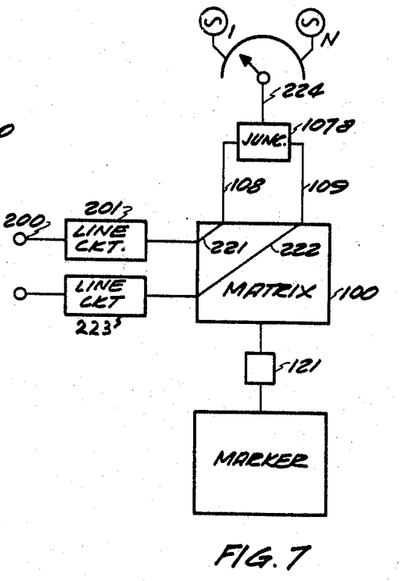
FIG. 7 is a simplified block diagram (following FIG. 6) which shows the completion of a local call.

For a local call, the marker 120 releases after it has looked at the first three digits. Meanwhile, four additional digits are received by the register from the calling subscriber. When all seven digits are received (FIG. 6), the register 209 again seizes the marker 120 via the register connector circuit 123. The marker 120 calls in a number group translator 125 via an accessing circuit 126. The translator converts the digital information stored in the register 209 into equipment location. The marker receives such equipment location information and the translator 220 immediately restores. Then, the marker uses (FIG. 7) the equipment location to establish a switch path 221 from the calling line circuit 201 to the calling side 108 of the local feed junctor 107a, and a path 222 from the called line circuit 223 to the called side 109 of the local feed junctor 107a.

As soon as these paths are completed, the marker 120 checks them for continuity and then latches and holds them. The marker causes the junctor 107a to set a ring select switch 224, which selects and transmits the appropriate ringing current to the called line. The marker and register then release. When the called party answers, the ring select switch releases. Thereafter, the paths 221, 223 are held from the junctor 107a for the duration of the call. Release may be under the control of either the calling party or the last party to hang-up.

Figure 8:
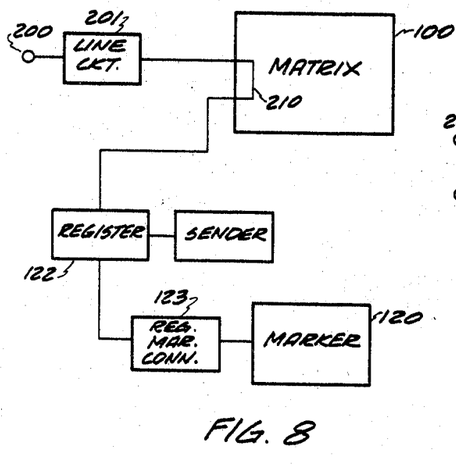
FIGS. 8–11 are a series of simplified block diagrams (following FIG. 6) which show the completion of a trunk call.

Trunk calls follow the logical sequence of events shown by FIGS. 2–6. However, this time (FIG. 8), the marker 120 senses the demand for a trunk to a distant office since such demand is indicated by the numerical values of the first three digits. The marker also stores an identification of the register that is involved in the call. Since each register is individually associated with a sender, this also identifies the sender that is to be used.

Figure 9:
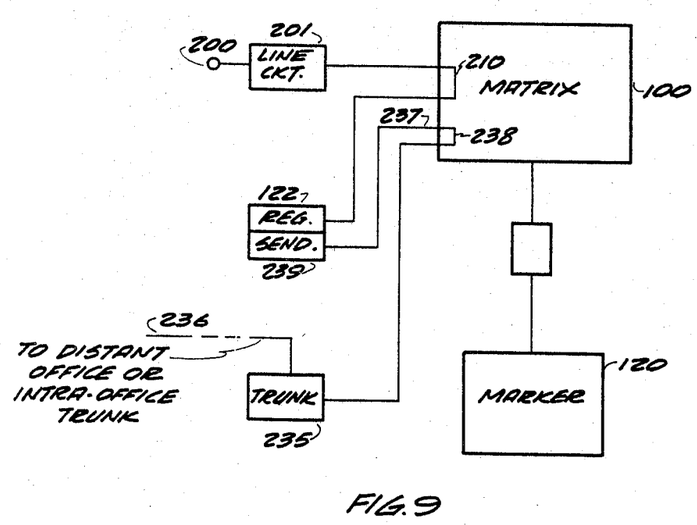

As shown in FIG. 9, the marker 120 selects an idle trunk circuit 235, which may be connected to a desired distant office via a line 236. Actually, there are two appearances of the register sender 122 in the matrix; one is for sending, one is for registering; both sending and registering can occur at the same time. Then the marker matches the matrix access 237 of the sender associated with register 122, with the appearance of the selected trunk circuit 235. A path 137 is completed from the sender through the matrix to the trunk circuit 235. As soon as this path is completed, the marker releases. The sender 237 transmits the digits which are necessary to complete the call. This can be done simultaneously, with the receipt of the last four digits over path 210.

Figure 10:
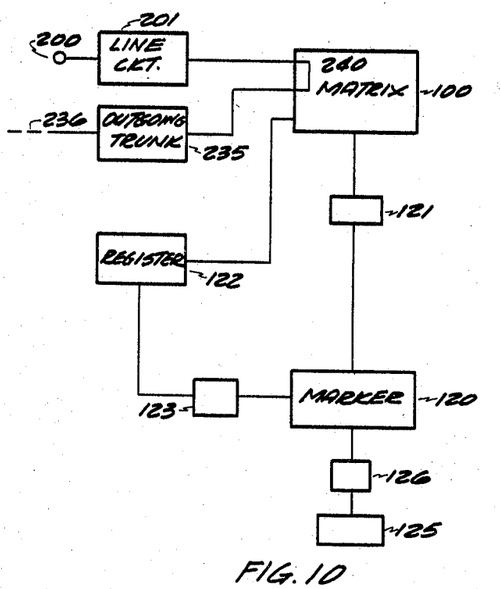
Figure 11:
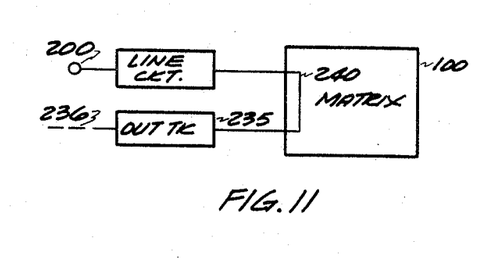

After all digits are sent over the trunk 236, to the distant office, the register 122 again calls in the marker (FIG. 10), and delivers the equipment location of the calling line and trunk circuit points of access in the matrix. The marker selects a desired path 240 from the calling line circuit through the matrix 100 to the outgoing trunk 236. The continuity of the path is tested, and then it is latched. Thereafter, talking battery is fed from the trunk to the calling line circuit 201. Then, the register, marker and access circuits are released. Thereafter, (FIG. 11) the call is restricted to the simplest available path 240 through the matrix. Again the release may be accomplished either responsive to the calling party release or the last party release.

The matrix for accomplishing the above described functions is shown generally at 100 in FIG. 1, and specifically in FIGS. 12–20. The principle is that, if possible, the system will select the shortest path 300 through the network 100. If this path 300 is not available, the next shortest path 301 is selected. If that path 301 is not available, another path 302 is selected. Thus, the network makes three attempts to complete a connection.

Figure 13:
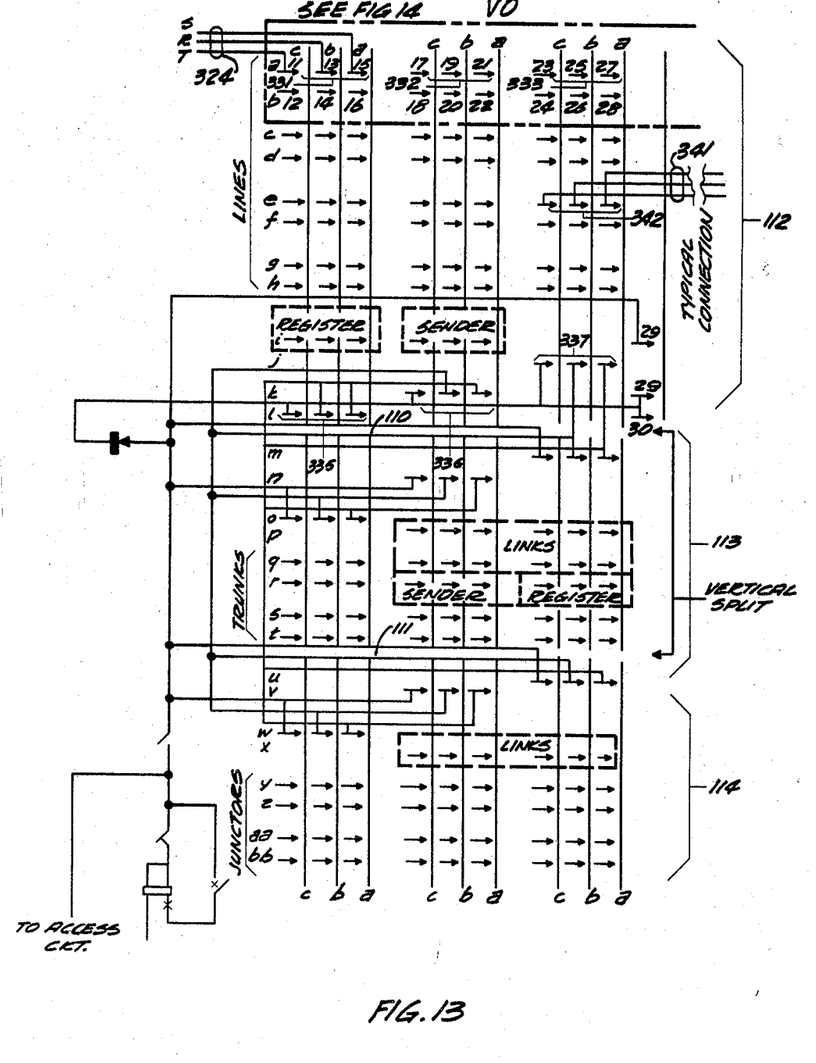
FIG. 13 shows an exemplary vertical of a crossbar switch.

This is done by a crossbar switch matrix as shown in general at 100 in FIG. 1, and specifically in FIG. 13. In one embodiment, the matrix includes a plurality of crossbar switches which are ganged together to act in unison. As shown at 110, the verticals are split into three electrical groups; although they remain a single mechanical unit. These electrical splits also appear in FIG. 15.

Figure 14:
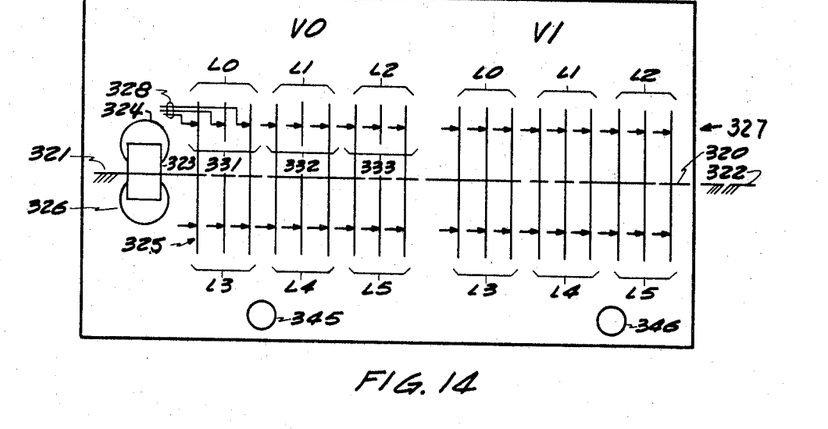
FIG. 14 shows two horizontally arranged crosspoints, one of which also appears in FIG. 13.
Figure 15:
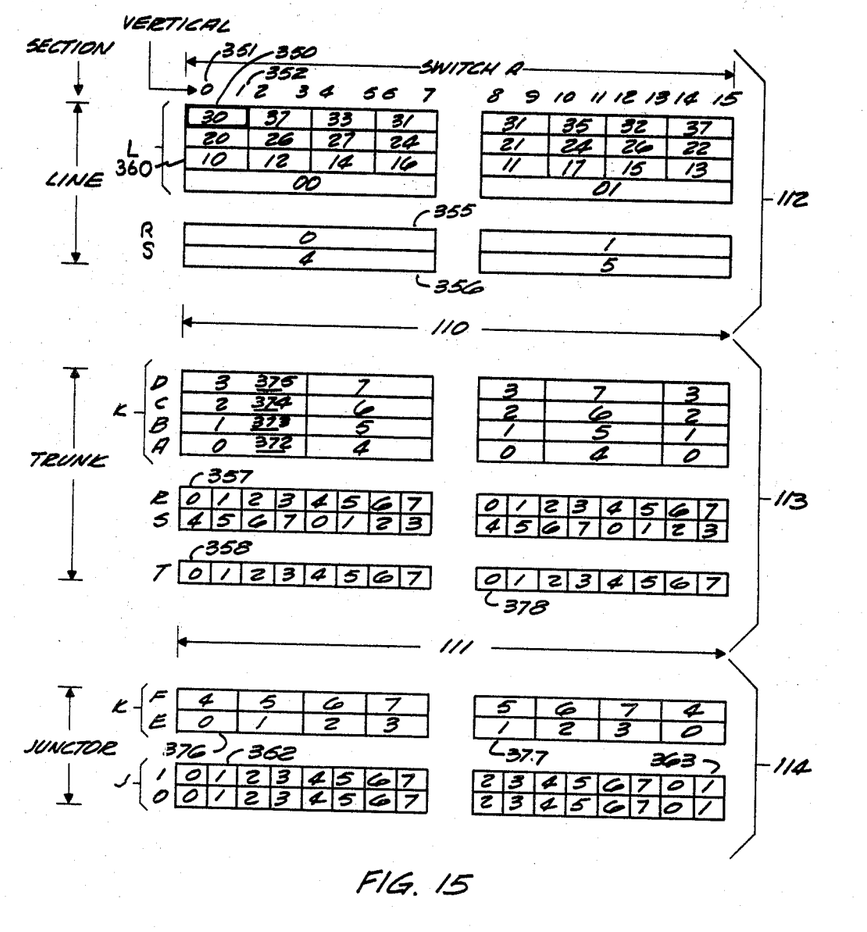
FIGS. 15–18 show how various circuits are connected into the matrix.
Figure 16:
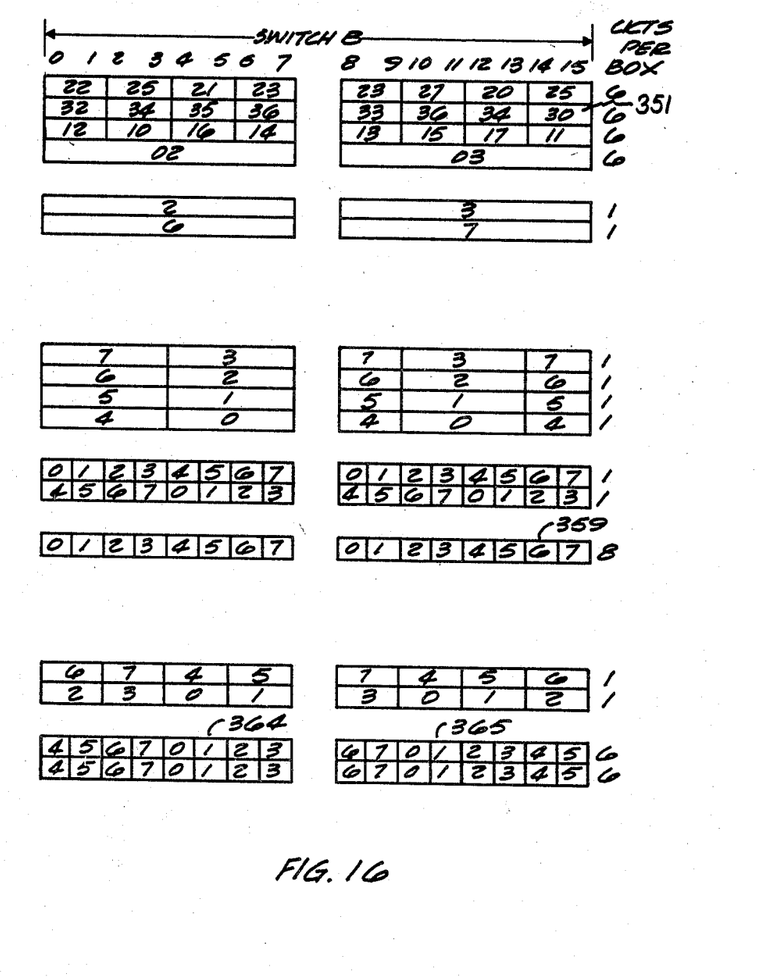

As those skilled in the art know, a crossbar switch such as this has a number of horizontal and vertical bars arranged to cooperate to select a crosspoint. As shown in FIG. 14, a select bar 320 is rotatably supported by bearings 321, 322 at each of its ends. An armature 323 is mounted on the bar to rotate it in either a clockwise or a counterclockwise direction. Thus, if coil 324 is energized, bar 320 rotates one-way to select contacts in row 325. If coil 326 is energized, bar 320 rotates in an opposite direction to select contacts in row 327. Then, a hold bar which is perpendicular to the select bar is operated to close a crosspoint at one of the selected rows. Three sets of contacts, such as 330, 331, 332 are operated at each crosspoint. A subscriber line is connected to each set of contacts, as line 328 is connected to contacts 331. In addition, one of several select bars is operated to select one of the three sets of contacts 331–333. For example, the contacts 331 are selected if a bar is operated to select the contacts 335. In like manner, the contacts 332 or 333 can be selected at 336 or 337, respectively.

Each set of contacts, such as 331, 332, 333, connects with the tip, ring and sleeve (T, R, and S) of a subscriber line. Thus, by way of example, FIG. 14 shows line 328 as connected with the contacts 331, and FIG. 13 shows the subscriber line 341 as connected to contacts 342. Other lines are connected in a similar manner.

An inspection of FIGS. 1 and 13 will disclose where the various circuits are connected into the crosspoint matrix. FIGS. 17–20 disclose how these circuits are grouped. For purposes of comparing the drawings, FIG. 14 shows two verticals V0, V1, which are side-by-side on a single crossbar switch. One vertical V0 is controlled by a hold magnet 345, the other vertical V1 is controlled by another hold magnet 346. A dot-dashed rectangle in FIG. 13 shows half of FIG. 14, that is the crosspoint of vertical V1, which is controlled by hold magnet 345. Obviously, FIGS. 13 and 14 could be expanded, as required, to show a complete crossbar switch. This is done in FIGS. 17–20 where boxes are used to indicate the structure shown in FIGS. 13, 14. For example, the box 350 may be the same structure that is shown in FIG. 14. The 0 at 351 indicates the vertical controlled by hold magnet 345, and the 1 at 352 indicates the vertical controlled by the hold magnet 346.

Figure 17:
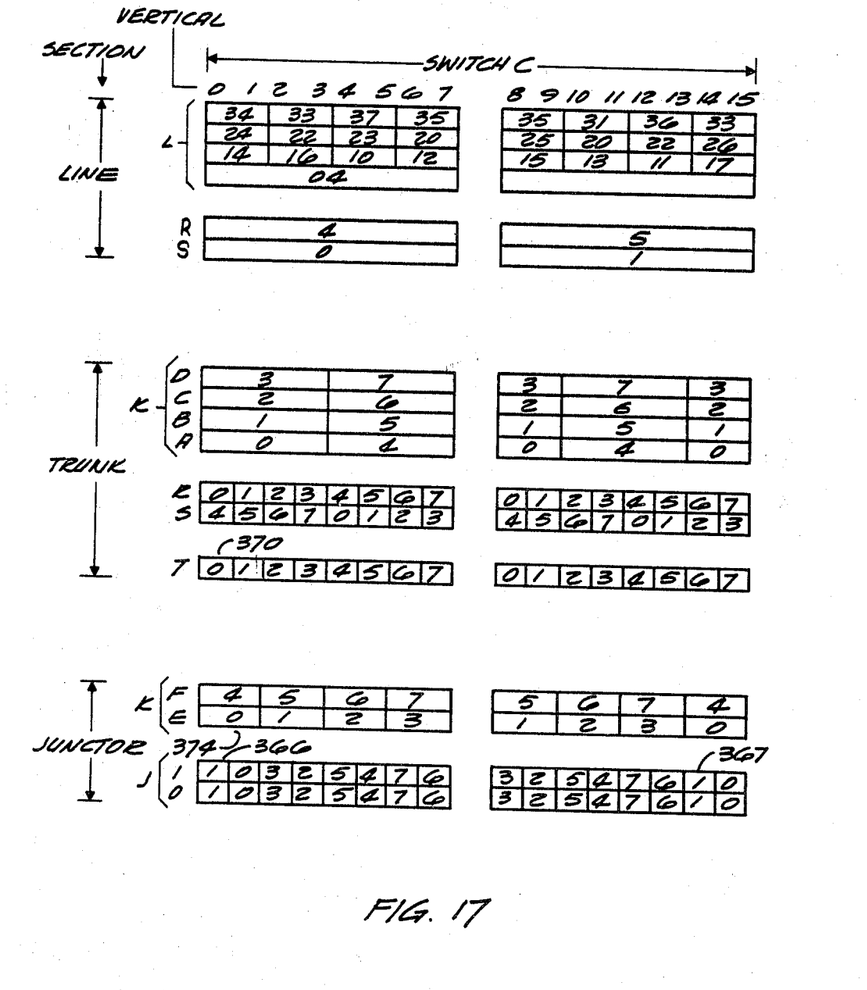
Figure 18:
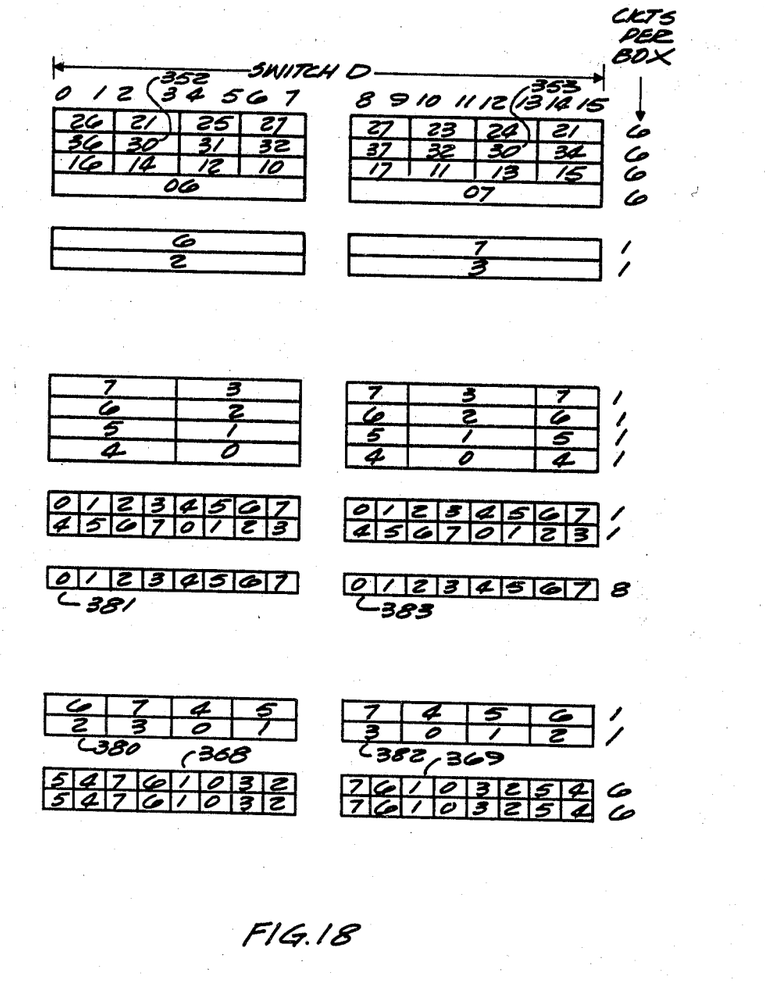
Figure 19:
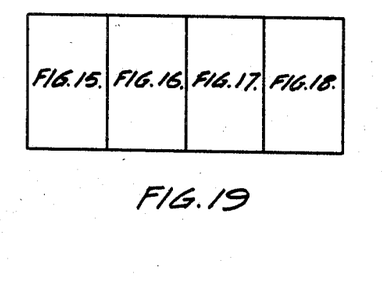
FIG. 19 shows how FIGS. 15–18 should be joined to provide a complete circuit.
Figures 20, 21:
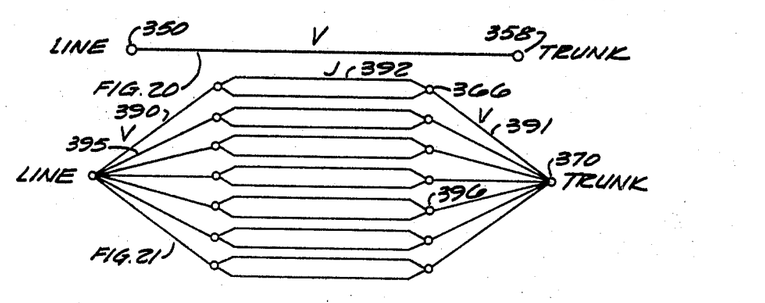
FIG. 20 graphically, shows the first preference connection.
FIG. 21 graphically shows the second preference connection.

The left hand margins of FIGS. 17, 19 carry the words "line, trunks and junctor" to indicate the points where the named equipments appear in the matrix. The letter L means "lines," the letters R and S mean "register" and "sender." The letter T designates "trunks," and the letter J designates "junctor." The letter K designates an interconnection circuit of jumper wires, sometimes called the "web," which provides alternate routes through the matrix. The term "web" has no special significance; it is used here simply to provide a second term meaning other junctors having a different pattern of optional connections. Thus, as will be apparent from FIGS. 21, 22, in one optional mode of switching, the junctors J are connected in a first pattern, as at 392. In another optional mode, the junctors are connected in a different pattern, as at 372–375. One or more optional patterns of junctor wires may be provided. Those who are skilled in the art may think of still other patterns which fit their particular traffic needs.

Six subscriber lines L0–L5 are designated as the "30-group." Other six line groups are similarly designated. This 30-group of subscriber lines is connected to the crossbar contacts in block 350. In like manner, the 30-group of subscriber lines is also connected to the contacts in blocks 351, 352, 353. By an inspection of FIGS. 17–20, the location of every other line in the system should be apparent. Finally, by comparison, it should be apparent that each group of lines appears throughout the matrix at different locations in different switches. Thus, the 30-group of lines appears at 350, 351, 352, 353 in the switches of FIGS. 17, 18 and 20. In like manner, every other line group also appears in four blocks. Since there are two complete sets of crosspoint contacts per block, there are 8 (eight) actual matrix appearances for every group of lines. It is not important where the eight appearances are located in the physical matrix provided that the proper intercircuit relations are maintained. Perhaps two blocks are in one switch as at 352, 353. Perhaps the block does not appear in a switch as at FIG. 19.

The registers and senders appear twice and in larger blocks. However, their locations are designated in the same manner. Thus, as indicated by block 355, the 0 register appears in each of the verticals 0–7 of the switch A, FIG. 17. As indicated at 356, the 4 register also appears in each of these verticals 0–7. A study of FIGS. 17–20 will quickly tell where each of the other registers is located. As FIG. 9 indicates, each register-sender combination must have two appearances in the matrix; once for line access (path 210) and once for trunk access (path 237). In FIG. 17, the line access is via matrix section 113 (block 357, for example), and the trunk access is via matrix section 112 (block 355, for example).

Figures 22, 23:
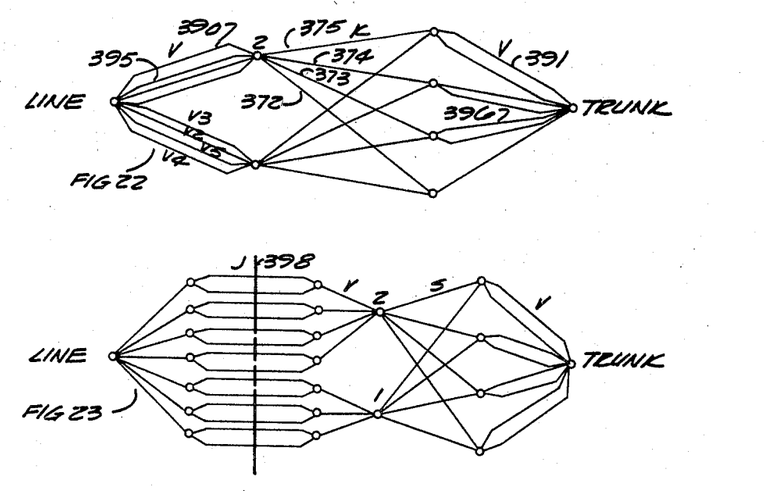
FIG. 22 graphically shows the third preference connection.
FIGS. 23 and 24 show how the size of the matrix is increased by adding more crossbar switches.

The matrix operation should be apparent by a comparison of the block diagrams of FIGS. 2–11 with the numerical designations of FIGS. 17–20. For example, suppose that a connection is required between a line in the 30-group and a trunk 0. It is easy to see that the shortest path (300, FIG. 12) occurs if two crosspoints are closed simultaneously in blocks 350, 358 of FIG. 17. This is shown in FIG. 22 where the desired trunk is reached via a single vertical. The same one vertical connection may be made to junctor 0, register 0, sender 4, etc. On the other hand, if a line in the 30-group should be connected to a trunk 6, the shortest one vertical path is through blocks 351, 359. Normally, the marker 120 will select the shortest path (the identity of which should be apparent from a study of FIGS. 17–20), and no other attempt will be made to complete a path if a single vertical is available.

Figure 12:
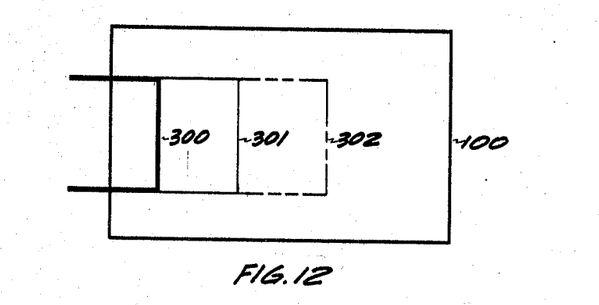
FIG. 12 is a graphical representation of the principle used to select a path through the network.

If the shortest path (300, FIG. 12) is not available, the marker will select the next preference path (301, FIG. 12). Again, suppose that a line in the 30-group must reach a trunk 0, but the 0 (block 350) in the single vertical path is busy, perhaps the 0 vertical is made busy because it is used by a 10-group line in the block 360. Thus, the 30-group of lines can use the 1 vertical in block 350 to reach the 1 junctor in block 362. By inspection, it is seen that the 1 junctor also appears in block 363–369. At the block 366, there is a coincidence with the 0 trunk which appears in block 370. Hence, the second preference path (301, FIG. 12) is completed via two verticals over the path represented by the blocks 350, 362, 366, 370. In like manner, any available one of the junctors could be used to establish a two vertical path. This is shown in FIG. 23. The system will not advance to its third preference attempt until it has exhausted all efforts to complete the second preference path.

Figure 24:
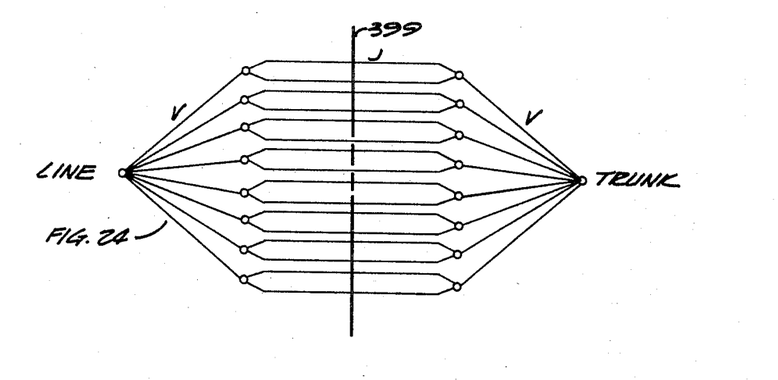

If the second preference path (FIG. 23) is not available, the call is routed through the third preference (FIG. 24). This attempt makes use of a web circuit which is identified by the letter K at the left hand side of FIGS. 17, 19. Again assume the need for a connection from the 30-line group to the 0 trunk at a time when the 0 vertical of switch A and the 1 junctor are busy. Perhaps the 1 junctor is busy because a call has been previously extended through block 363. Of course, every other possible junctor path shown in FIG. 23 must also be busy before the third attempt is made. The 30-group of lines in block 350 has access to the 0, 1, 2, and 3 web circuits via the blocks 372, 373, 374 and 375.

To find the second vertical which must operate on calls through the web, it is necessary to study the K circuits which appear in the "trunk" and "junctor" groups 113, 114 of the matrix. Under the above assumption, the optional paths could not include blocks 350 and 372 because the 0 web circuit of block 372 reappears at 376, where it gives access to trunk 0 via the block 358 which is assumed to be busy. Therefore, an idle alternative path must be used. These possible paths include any of the following blocks: the 30-line group (350), the 1 web link (373), (377), and the 0 trunk (378). Other paths from the 30-group to the 0 trunk include the blocks 350, 374, 380, 381; or 350, 375, 382, 383. A study of the other appearances of the 30-group of lines will tell where the remaining web circuits are located in the matrix.

If none of the described paths are idle, the call is blocked.

Briefly, in resume, the first preference is via the shortest path (one vertical link); the second preference is the intermediate length path via a junctor and two links; the last preference is the path via the web links.

These optional routing possibilities are shown by FIGS. 21–25. The shortest path (FIG. 21) include a single vertical connected between a line and a trunk. For this attempt, there is a single path. The next attempt (FIG. 22) includes seven vertical appearances 390 of a line group; that is, the eight appearances of a line group less the one use in FIG. 21, which is obviously busy if it is not used. The trunk also has seven verticals 391. These verticals 390, 391 are interconnected by fourteen junctors 392. The third attempt (FIG. 23) uses the same seven line verticals 390 and trunk verticals 391; however, the web circuit K gives a possibility of making alternative connections. For example, suppose that only the line vertical 395 and trunk vertical 396 are idle. In FIG. 23 there is no path between the two idle verticals. In FIG. 24, the web path 373 allows a completion of the desired connection.

The layout of the lines, trunks and junctors is very important to the most economical use of the matrix. Any failure to distribute the matrix loading in an efficient manner will result in a loss of switching capacity.

One example of the desired inter-circuit relation is found in FIGS. 17–20; other layouts may be used provided they follow the following rules:

(1) Every line group must have access to every trunk group via a single vertical.

(2) Every line group must have access to every junctor group via a single vertical.

(3) Every trunk group must have access to every junctor group via a single vertical.

(4) Every line group appears once on a pair of verticals with three other line groups, but one line group reappears with any of those same line groups on any other pair of verticals.

(5) The junctor and web circuits spread the matrix appearances on a full availability basis so that every one of the lines has access to every trunk.

An advantage to the use of the foregoing equipment assignment rules is that they make maximum use of bare wire multiplying, to the extent that such use is possible in the system. This is always desirable since it is the least expensive way to complete connections.

FIG. 1 shows two switching matrices; both numbered 100, since they are identical. This use of multi-matrix units provide additional switching capacity. To complete the inter-matrix unit connections, it is only necessary to connect the junctors 103 together so that all junctors are common to all units. This is shown in FIGS. 22 and 23 where the dot-dashed lines 395, 394 indicate the common junctor points. The equipment on the left-hand side of either of these lines could be the left-hand switch of FIG. 1, and the equipment on the right-hand side could be the right-hand switch of FIG. 1. Preferably, the lines are still assigned by units, as taught by FIGS. 15–18. Thus no line will appear in both of the blocks 100 of FIG. 1. However, all of the switches operate in unison so that the entire system retains its unitary characteristics.

If more than two matrix units are required, more units are added in the same manner.

While the foregoing description has been limited to a disclosure of a single preferred embodiment of the invention, it should be clearly understood that the attached claims are intended to cover all equivalents which fall within the spirit of the invention.

We claim:

1. A telephone system comprising a plurality of subscriber lines, trunks, junctors, and a switching matrix, said matrix comprising a plurality of horizontal and vertical multiples having crosspoint switches at the intersections thereof, said vertical multiples being split into a plurality of electrical groups, means for connecting said lines to a first of said groups, means for connecting said trunks to another of said groups, means for connecting said junctors to a third of said groups, and means for extending a path through said matrix by completing a connection across at least one of said splits.

2. The system of claim 1 wherein said lines, trunks, and junctors are distributed throughout said matrix according to the following rules:

(1) every line group has access to every trunk group via at least a single vertical;

(2) every line group has access to every junctor group via at least a single vertical; and (3) every trunk group has access to every junctor group via at least a single vertical.

3. A switching matrix comprising a plurality of crossbar switches ganged together to operate as a unit whereby select bars operate simultaneously in each of said switches, means for splitting the verticals of said switches into a plurality of electrically isolated contact groups while retaining the unity of the mechanical operation inherent thereto, and means for completing paths through said matrix by selectively interconnecting contacts in different ones of said groups.

4. The matrix of claim 3 and means for connecting a first of said contact groups to function as primary switches, a second of said contact groups as secondary switches, and means connected between said groups to provide a primary-secondary stage linking.

5. The matrix of claim 4 and means for interconnecting various ones of said stages to provide a plurality of optional paths between said groups of contacts, said options having a given preference.

6. A switching matrix comprising a plurality of non-specialized crossbar switches which are ganged together to provide a field of crosspoints, means for splitting the contacts of said units into a plurality of independent electrical groups while retaining the unit of the multiple operation, each of said electrical groups providing a specialized switching function with respect to any given call, means for completing paths through said matrix by selectively interconnecting contacts in different ones of said groups, according to the specialization thereof to provide a plurality of cascaded switching stages for said given call, wherein said switches have a plurality of horizontal and vertical multiples with crosspoint switches at the intersection thereof, said crosspoint switches being operated by a coordinate arrangement of select and hold bars, said splitting means being one of said multiples split into said plurality of independent electrical groups, a plurality of subscriber lines, trunks, and junctors, means for connecting said lines to a first of said groups to provide one switching stage, means for connecting said trunks to a second of said groups to provide another switching stage, means for connecting said junctors to a third of said groups to provide still another switching stage, and means for extending a path through said matrix by operating crosspoints in a plurality of said sections to complete paths across at least one of said splits.

7. A switching matrix comprising a plurality of switches which are ganged together to provide a field of crosspoints, means for operating multiple contact groups as non-specialized switching units, means for splitting the contacts of said units into a plurality of independent electrical groups while retaining the unity of the multiple operation, each of said electrical groups providing a specialized switching function with respect to any given call, and means for completing paths through said matrix by selectively interconnecting contacts in different ones of said groups, according to the specialization thereof to provide a plurality of cascaded switching stages for said given call, wherein any of said groups in a multiple can function as either a primary or a secondary switch depending upon the nature of a given call.

8. A bidirectional switching matrix comprising a plurality of horizontal and vertical multiples, having crosspoint switches at the intersections thereof, means for operating the crosspoints of said multiples as a unitary group, said vertical multiples being split into a plurality of independent electrical groups, means for connecting lines to one of said groups, means for connecting trunks to a second of said groups, means for connecting junctors to a third of said groups, and means for originating or terminating a call at any trunk or link for bidirectionally extending paths through said matrix.

9. The bidirectional matrix of claim 8 wherein said lines, links, and junctors are distributed throughout the matrix so that:

(1) every line group has access to every trunk group via at least a single vertical;

(2) every line group has access to every junctor group via at least a single vertical; and (3) every trunk group has access to every junctor group via at least a single vertical.

10. A switching matrix comprising a plurality of crossbar switches ganged together so that all switches operate as a unit, means for splitting the verticals of each of said switches into a plurality of electrically isolated contact groups while retaining the unity of mechanical operation inherent thereto, means for uilizing a first of said groups to function as primary switches, a second of said groups as secondary switches, means extending between said groups to provide interstage linking, means for comprising another of said groups for extending common junctor multiples throughout all of said units, and means comprising said common junctors for completing paths through said matrix by selectively interconnecting contacts in different ones of said groups.

11. A switching network comprising a plurality of nonspecialized switches for interconecting a plurality of lines, means for completing a path through said matrix in any of a plurality of optional modes, each of said modes involving a different number of verticals and means for attempting to complete said paths by any of said optional modes in a given order of option preferences.

12. The network of claim 11 wherein said switching matrix comprises a plurality of horizontal and vertical multiples having crosspoint switches at the intersections thereof, the first of said option preferences comprising means for completing said path via a single one of said vertical multiples.

13. The network of claim 11 wherein said switching matrix comprises a plurality of horizontal and vertical multiples having crosspoint switches at the intersections thereof, the second of said option preferences comprising means for completing said path via at least two of said vertical multiples and common junctors running through all of said vertical multiples.

14. The network of claim 13 wherein the third of said option preferences comprises means for completing said path via at least two of said vertical multiples and a different pattern of junctors for distributing connections through said verticals, said common junctors and other junctors providing a full availability distribution of paths from inlets to outlets of said network.

15. The network of claim 11 wherein said matrix comprises a plurality of switching units, said lines being connected into said matrix on a group of lines per unit basis, and means comprising a plurality of junctors running between said units for providing inter-unit conections.

References Cited
UNITED STATES PATENTS

| | | | |
|---|---|---|---|
| 3,313,888 | 4/1967 | Ohno | 179—22 |
| 3,156,780 | 11/1964 | Browell et al. | 179—22 |
| 3,317,676 | 5/1967 | Ekbergh et al. | 179—22 |

WILLIAM C. COOPER, *Primary Examiner.*